United States Patent
Ji et al.

(10) Patent No.: US 6,888,838 B1
(45) Date of Patent: May 3, 2005

(54) FAST IP ROUTE LOOKUP WITH CONFIGURABLE PROCESSOR AND COMPRESSED ROUTING TABLE

(75) Inventors: Hongbin Ji, San Jose, CA (US); Rangarajan Srinivasan, Los Gatos, CA (US)

(73) Assignee: Tensilica, Inc., Santa Clara, CA (US)

( * ) Notice: Subject to any disclaimer, the term of this patent is extended or adjusted under 35 U.S.C. 154(b) by 855 days.

(21) Appl. No.: 09/780,895

(22) Filed: Feb. 9, 2001

Related U.S. Application Data

(60) Provisional application No. 60/249,627, filed on Nov. 16, 2000.

(51) Int. Cl.[7] .......................... H04L 12/28; H04L 12/56
(52) U.S. Cl. ...................................... 370/401; 370/392
(58) Field of Search ................................ 370/389–392, 370/428, 472, 474, 412, 429, 400–401; 709/245, 238

(56) References Cited

U.S. PATENT DOCUMENTS

| | | | |
|---|---|---|---|
| 6,018,524 A | * 1/2000 | Turner et al. | 370/392 |
| 6,141,738 A | * 10/2000 | Munter et al. | 711/206 |
| 6,563,823 B1 | * 5/2003 | Przygienda et al. | 370/392 |
| 6,571,313 B1 | * 5/2003 | Filippi et al. | 711/108 |
| 6,631,419 B1 | * 10/2003 | Greene | 709/238 |
| 6,658,482 B1 | * 12/2003 | Chen et al. | 709/245 |
| 6,697,363 B1 | * 2/2004 | Carr | 370/389 |

OTHER PUBLICATIONS

Gupta, et al., "Routing Lookups in hardware at Memory access Speeds," IEEE, 1998, pp. 1240–1246.
Chiueh, et al., "High–Perfomance IP Routing Table Lookup Using CPU Caching," IEEE, 1999, pp. 1421–1427.
Degermark, et al., "Small Forwarding Tables for Fast Routing Lookups," ACM, 1997, pp. 3–13.
Srinivsan et al., "Fast Address Lookups Using Controlled Prefix Expansion," pp. 1–37.
Huang, et al., "A Novel IP–Routing Lookup Scheme and Hardware Architecture for Multigigabit Switching Routers," IEEE Journal on Selected Areas in Communications, vol. 17, No. 6, Jun. 1999, pp. 1093–1104.

* cited by examiner

Primary Examiner—Ajit Patel
Assistant Examiner—Chirag Shah
(74) Attorney, Agent, or Firm—Pillsbury Winthrop LLP

(57) ABSTRACT

A novel compression method uses bitmaps to reduce the memory storage requirement of routing table information to about 3 MB. The data structure can be used for both route lookup and update. It does not require a separate data structure to be used for route update. A fast route lookup method is also disclosed. An efficient update method supports incremental route update. Through configuring a processor properly and developing a few customized instructions specifically for route lookup, the system can achieve more than 10 million lookups per second (MLPS) at 200 MHz. Using a configurable processor for route lookup/update provides more flexibility and extensibility which supports different data structures and lookup/update methods to meet application specific needs. The data structure and lookup method can be implemented in pure hardware in a pipelined fashion to achieve approximately 100 MLPS.

7 Claims, 11 Drawing Sheets ically doing a routing table lookup based on an IP

FAST IP ROUTE LOOKUP WITH CONFIGURABLE PROCESSOR AND COMPRESSED ROUTING TABLE

CROSS-REFERENCE TO RELATED APPLICATION

This application is related to the U.S. provisional application No. 60/249,627 entitled "Fast IP Route Lookup with Configurable Processor and Compressed Routing Table" filed on Nov. 16, 2000, from which this application claims priority under 35 U.S.C. § 119(e).

BACKGROUND OF THE INVENTION

1. Field of the Invention

The present invention is directed to communication networks and, more particularly, to routing messages in communication networks.

2. Background of the Related Art

Since the 1990s the Internet has grown substantially in terms of the continuously increasing amount of traffic and number of IP routers and hosts on the network. One of the major functions of IP routers is packet forwarding, which is basically doing a routing table lookup based on an IP destination field in an IP packet header of an incoming packet and identifying a next hop over which the incoming packet should be sent.

Primarily, three approaches have been used for IP route lookup—pure software, pure hardware and a combination of software and hardware. In early-generation routers where line card interfaces were running at low speed, appropriately programmed general-purpose processors were typically used to perform packet forwarding. This is a pure software approach. Its main advantages are that it is flexible, easy to change and easy to upgrade. Its main disadvantages are its poor performance, low efficiency and difficulty in being scaled to high-speed interfaces.

In later-generation routers where speed and performance are critical, the pure hardware approach is taken. Here, customized application-specific integrated circuit (ASIC) hardware is developed to achieve very high performance and efficiency. The main disadvantages of this approach are that it is hard to change or upgrade to accommodate new features or protocols, it is too expensive to develop, and it has a long development cycle—typically, about 18 months.

In the latest generation of routers, a combination software and hardware approach is taken. This is a so-called "network processor", which uses a special processor optimized for network applications instead of a general purpose processor. The advantage of this approach is that the network processor is programmable, flexible, and can achieve performance comparable to that of the customized ASIC. It also shortens the time for product to market, can be easily changed or upgraded to accommodate new features or protocols, and allows customers to change the product to a limited degree.

For the software approach, one study reports that two million lookups per second (MLPS) can be achieved using a Pentium II 233 MHz with 16 KB L1 data cache and 1 MB L2 cache. It requires 120 CPU cycles per lookup with a three level trie data structure (16/8/8). Further, software has been developed which compresses the routing table into a small forwarding table that can be fit into the cache memory of an ordinary PC. This arrangement requires about 100 instructions per lookup and is claimed to be capable of performing 4 MLPS using a Pentium 200 MHz processor.

The hardware approach has been taken by many IP router vendors. For example, Juniper Networks designed an ASIC called the "Internet Processor" which is a centralized forwarding engine using more than one million gates with a capacity of 40 MLPS. The Gigabit Switch Router (GSR) from Cisco Systems is capable of performing 2.5 MLPS per line card (OC48 interface) with distributed forwarding. The whole system can achieve 80 Gb/s switching capacity.

The network processor approach has recently become popular. For example, the XPIF-300 from MMC Networks supports 1.5 million packets processed per second (MPPS) with a 200 MHz processor optimized for packet processing; another product, the nP3400, supports 6.6 MPPS. The IXP1200 network processor from Intel uses one StrongARM microprocessor with six independent 32 bit RISC microengines. The six microengines can forward 3 MPPS. The Prism from Siterra/Vitesse uses four embedded custom RISC cores with modified instruction sets. The C-5 from C-Port/Motorola uses 16 RISC cores to support an interface capable of supporting a communication speed of up to 5 Gb/s. Ranier from IBM uses 16 RISC cores with embedded MAC & POS framers. Agere/Lucent also has developed a fast pattern processor to support speeds up to the OC-48 level.

Traditionally the IPv4 address space is divided into classes A, B and C. Sites with these classes are allowed to have 24, 16 and 8 bits for addressing, respectively. This partition is inflexible and has caused wastes of address space, especially with respect to class B. So, bundles of class C addresses were furnished instead of a single class B address. This has caused substantial growth of routing table entries. A new scheme called classless inter-domain routing (CIDR) was used to reduce the routing table entries by arbitrary aggregation of network addresses. Routing table lookup requires longest prefix matching, which is a much harder problem than exact matching. The most popular data structure for longest prefix matching is the Patricia trie or level compressed trie, which is basically a binary tree with compressed levels. A similar scheme called reduced radix tree has been implemented in Berkeley UNIX 4.3. Content Addressable Memory (CAM) is used for route lookup, but it only supports fixed length patterns and small routing tables. A technique using expanded trie structures with controlled prefix expansion has been introduced for fast route lookup. Another technique uses a bitmap to compress the routing table so that it can fit into a small SRAM and help to achieve a fast lookup speed. In order to add a new route into the table, the update method requires sorting and preprocessing of all existing routes with the new route, which is very expensive computation. In other words, this method does not support incremental route update.

A large DRAM memory is used in another architecture to store two-level routing tables. The most significant 24 bits of IP destination address (25) are used as an index into the first level, while the remaining eight bits are used as offset into the second table. This is a so-called 24/8 data structure. The data structure requires 32 MB memory for the first level table but much less memory for the second level.

SUMMARY OF THE INVENTION

An embodiment of the present invention employs a 24/8 data structure similar to that described above. The difference is that the embodiment uses a common data structure for both lookup and update. In other words, the technique employed by the embodiment does not necessarily need to keep an update table separate from the lookup table. This reduces memory requirements. Furthermore, in the embodiment the 24/8 data structure is compressed to a structure called 24/8c which only requires about 3 MB of memory for storage. The technique of equal cost multiple paths is effective for congestion management and load balancing. This requires storage of multiple next hops for a particular route. The data structure used in the embodiment can be extended to support this requirement. Thus, contributions of the embodiment include a more compact and common data structure for route lookup as well as update, a fast IP route lookup method that can achieve 10 MLPS by using a properly-configured processor with a few customized instructions added which are optimized for IP packet lookup, and a novel route update method which supports incremental update.

The data structures and methods also can be implemented in pure hardware, in which case each route lookup can be designed to have as few as three memory accesses. The routing table can be stored in external SRAM with a typical 10 ns access time. Further, the lookup method can be implemented using pipelining techniques to perform three lookups for three incoming packets simultaneously. Using such techniques, 100 MLPS performance can be achieved.

BRIEF DESCRIPTION OF THE DRAWINGS

These and other aspects of an embodiment of the present invention are better understood by reading the following detailed description of the preferred embodiment, taken in conjunction with the accompanying drawings, in which.

DETAILED DESCRIPTION OF PRESENTLY PREFERRED EXEMPLARY EMBODIMENTS

Figure 1:
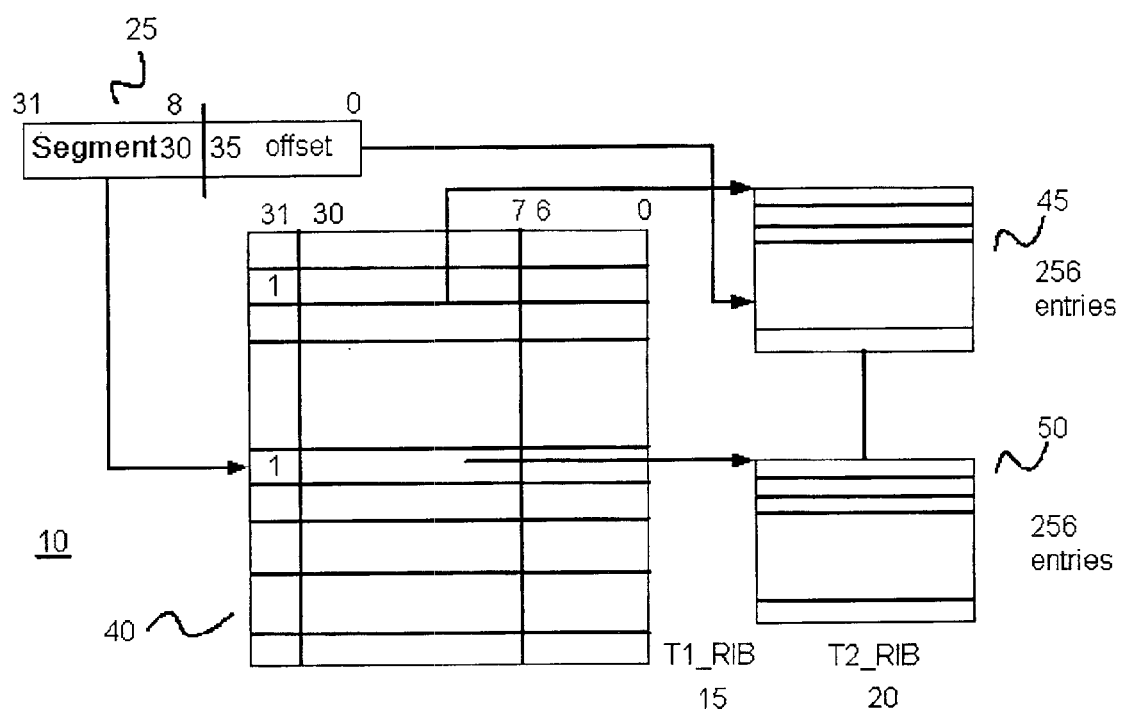
FIG. 1 shows a two level hierarchical data structure to store routing information base in an embodiment of the present invention.

Routers in the Internet are organized in a loosely hierarchical fashion. Most backbone routers are operated and owned by major service providers. These routers have "default free" routing tables, i.e., they are supposed to recognize all incoming packets with various IP destination addresses. This means that they don't need to use a default route for incoming data packets. Typically there are 50,000 entries in backbone routers, and this number continues to increase as more hosts and routers are deployed. Enterprise routers, which are used by campuses and organizations, have fewer entries (about 1,000). However, some of the enterprise routers for large organizations may have large routing tables and look like backbone routers.

Generally speaking, a routing table entry stores only IP address prefixes in CIDR systems, rather than using class address allocation as described above. Since each next hop is connected to one of the egress line cards, the egress (or output) port number can be used to represent the next hop. So, a routing table entry will be in a format such as (IP address, mask or prefix length, output port number). Note that the average size of packets passing through routers is about 1,000 bits while about 40% of the packets are 40 bytes or less (these are TCP/IP ACK/NACK packets).

Using the routing tables (made available by the Internet Performance Measurement and Analysis Project) from five major backbone routers (Mae-East, Mae-West, AADS, PacBell, and Paix), TABLE 1 gives the number of routes for certain prefix length ranges collected on a given day at these major backbone routers' network access points (NAPs).

TABLE 1

| NAP\ Prefix Range | Mae-East NAP | Mae-West NAP | AADS NAP | PacBell NAP | Paix NAP |
|---|---|---|---|---|---|
| 0–7 | 0 | 0 | 0 | 0 | 0 |
| 8–15 | 148 | 245 | 155 | 195 | 592 |
| 16–23 | 11750 | 14712 | 13135 | 15980 | 35974 |
| 24 | 11961 | 17084 | 15379 | 20312 | 50460 |
| 25–32 | 64 | 55 | 62 | 71 | 76 |
| Total | 23923 | 32096 | 28731 | 36558 | 87102 |

TABLE 1 shows that there are no routes with prefix length less than eight in these default-free backbone routers. Further, more than 50% of total routes have a prefix length of 24 and most of the routes (more than 99%) have prefix length from 16 to 24. Also, the number of routes whose prefix length is more than 24 is less than 100, i.e., 0.3%.

TABLE 2 gives the number of routes per traditional Class A (0.0.0.0–127.0.0.0), Class B (128.0.0.0–191.255.0.0), "The Swamp" (192.0.0.0–192.255.255.255), and Class C (193.0.0.0–223.255.255.0) addresses for this data set. It should be noted that most of the routes are in Class C. The table also gives the number of next hops by analyzing these traces and shows that the number of next hops at these backbone routers is less than 100.

TABLE 2

| NAP\ Class | Mae-East NAP | Mae-West NAP | AADS NAP | PacBell NAP | Paix NAP |
|---|---|---|---|---|---|
| Class A | 1794 | 2705 | 2279 | 2487 | 6415 |
| Class B | 2393 | 3451 | 3120 | 3512 | 10060 |
| Swamp | 1754 | 2303 | 1996 | 2397 | 6376 |
| Class C | 13063 | 14682 | 21335 | 28161 | 17909 |
| Total | 19004 | 23141 | 28730 | 36557 | 40760 |
| # of NHs | 52 | 44 | 42 | 1 | 22 |

Generally speaking, the number of routes is increasing over a long time as more hosts and routers are added to the Internet, and one backbone router has about 100,000 routes. These observations can be important in the design of an appropriate data structure to store routing information and to accelerate lookup/update while minimizing memory requirements.

A data structure called 24/8 has been developed where the first 24 bits of an IP destination address contained in an IP packet are used as an index to a first level routing table while the remaining eight bits are used as an index to a second level routing table. The 24/8 data structure requires about 32 MB of memory storage. First, a data structure similar to that described earlier is developed. In the embodiment, however, there is no need to have a separate data structure for route update. In other words, the embodiment's data structure may be common for route lookup and update. It also means that there is not necessarily a need to store a separate update routing table. Next, a compressed 24/8 data structure (called a 24/8c structure) which reduces the memory requirement for route lookup storage to about 3 MB is developed. This data structure can be used for both IPv4 and LPv6 transmission protocols; however, this discussion focuses on the IPv4 protocol.

An IPv4 packet has a field at the OSI Layer 3 IP header containing its destination IP address, which is 32 bits long. The most significant 24 bits are grouped together and called a "segment" and the remaining 8 bits are called an "offset". A two-level table is created to store a routing information base (RIB); the first level of the table, indexed by the segments, will be denoted herein as T1_RIB, and the second level of the table, indexed by the offsets, will be denoted as T2_RIB. FIG. 1 shows the two hierarchical levels T1_RIB (15) and T2_RIB (20) of the 24/8 data structure 10.

The segment (30), or most significant 24 bits of an IP destination address (25), is used as an index to T1_RIB (15). The segment index (30) to T1_RIB (15) is from 0.0.0 (for the first entry (40)) to 255.255.255 (for the last entry (40)). T1_RIB (15) has 224 entries in all. Each entry (40) in T1_RIB (15) is two bytes long, so the total size of T1_RIB (15) is $2^{24}*2$ bytes=32 MB. Each entry (40) in T1_RIB (15) stores next hop and prefix length (NHPL) information (discussed in greater detail below) if there is not any route whose prefix matches the index of this entry (40) and has a prefix length greater than 24.

If there is at least one route associated with this entry (40) having a prefix length greater than 24, the above entry (40) stores a base address pointing to a region (45) in T2_RIB (20), the region (45) having 256 entries. Those entries (40) in T1_RIB (15) which store the base addresses pointing to T2_RIB (20) use distinct, non-overlapping base addresses. The remaining eight bits (35) in the IP destination address (25) are used as an offset pointing to a particular entry (50) in the T2_RIB region (45) with the base address given by the least significant fifteen bits in the T1_RIB entry. Each entry (50) in T2_RIB (20) is two bytes which store next hop and prefix length (NHPL) information. Note that each region in T2_RIB has 256 entries. Since the number of routes with a prefix length more than 24 is less than 100 as shown in TABLE 2, the size of T2_RIB (20) may be less than 100*256*2=50 KB.

The next hop (60) and prefix length (65) information are stored for each route. The reason that the prefix length (65) of each route entry is stored is for the purpose of route update. Suppose the initial route table is empty. A new IP route 38.170.0.0/16/1 (the first field is the 32-bit IP address (25) in dot format, the second field "16" indicates prefix length (65) while the third field "1" is the next hop (60)), with an IP address corresponding to the binary string 0010 0110.1010 1010.0000 0000.0000 0000 comes in to a router implementing this system from a peer routing device. Since the prefix length is 16, this IP address covers all of the $2^{32-16}=2^8$ possible addresses generated by variation of the least significant 16 bits. Thus, this requires an update of the entries (40) in T1_RIB (15) from the 38.170.0.0 entry to the 38.170.255.255 entry (256 entries, with each entry representing one block of 256 IP addresses, e.g., 38.170.0, 38.170.1, etc.).

Suppose a new IP route 38.170.141.0/24/2 comes in. Since the prefix length is 24, this IP address covers all of the $2^{32-24}=2^8$ possible addresses generated by variation of the least significant eight bits. Since this address is more specific than the previous address, there is a need to overwrite the entry (40) indexed by 38.170.141 (representing the 256 addresses 38.170.141.0 to 38.170.141.255) in T1_RIB (15) with the new next hop (60).

If the order of the two incoming routes were reversed, there is no need to overwrite the entry (40) indexed by 38.170.141 in T1_RIB (15) because the second entry would not be more specific than the first. In that case, only the entries from 38.170.0 to 38.170.255 on either side of the 38.170.141 entry need be overwritten. Thus, as described in greater detail below, the prefix length (65) associated with each entry (40), (50) is stored in the routing table (10).

Figure 2A:
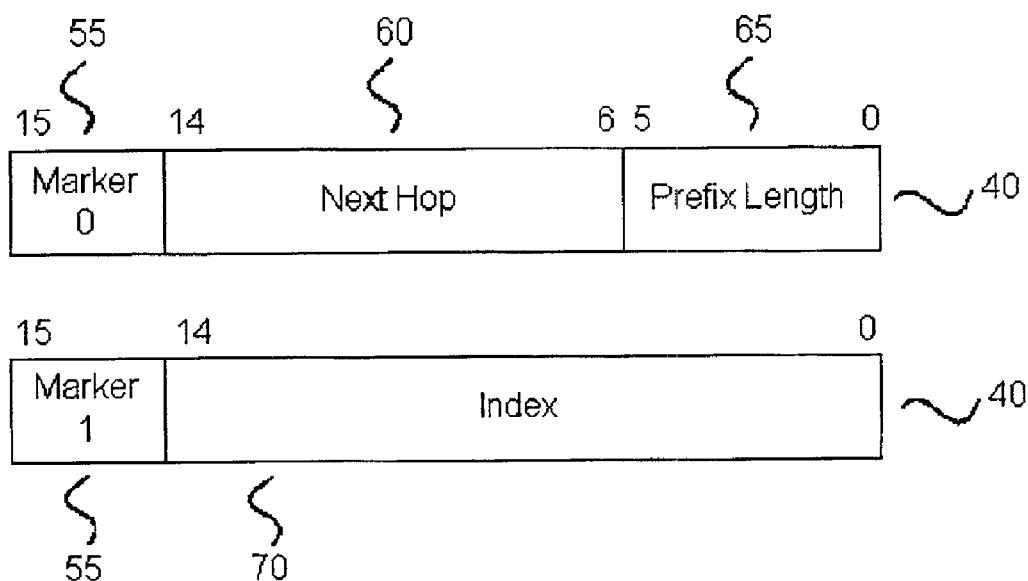
FIGS. 2A and 2B show a data structure to store next hop/index and prefix length in each entry in the two hierarchical tables, T1_RIB and T2_RIB, in the embodiment.
Figure 2B:
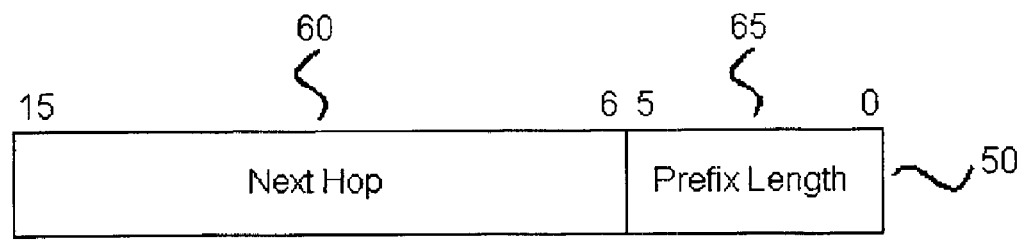

The format of each entry (40) and (50) in T1_RIB (15) and T2_RIB (20) is shown in FIGS. 2A and 2B, respectively. For T1_RIB entries (40), bit fields are used as follows.

NHPL[15] is the most significant bit (a marker bit (55)) and represents whether the following nine bits store next hop information or an index into the second level table (20). If NHPL[15] is zero, NHPL[14:6] stores next hop information (60). Otherwise, NHPL[14:0] stores index information (70) into the table T2_RIB (20).

NHPL[14:6] stores next hop information (60) or the most significant nine bits of index information (70) depending on the marker bit NHPL[15].

NHPL[5:0] stores the prefix length (65) of the route associated with that entry or the least significant six bits of index information (70). The prefix length (65) is in the range of zero to 32 which can certainly be covered by these six bits. If NHPL[15] is one, NHPL[14:0] (15 bits) stores an index (70) into the second table (20). These 15 bits (70) can cover the range from 0 to 32,767, which is far more than sufficient for indexing into the second level table (20).

For each entry (50) in T2_RIB (20), the first ten bits are used to store next hop information (60) while the remaining six bits are used to store the prefix length (65) associated with the entry (50).

Figure 6:
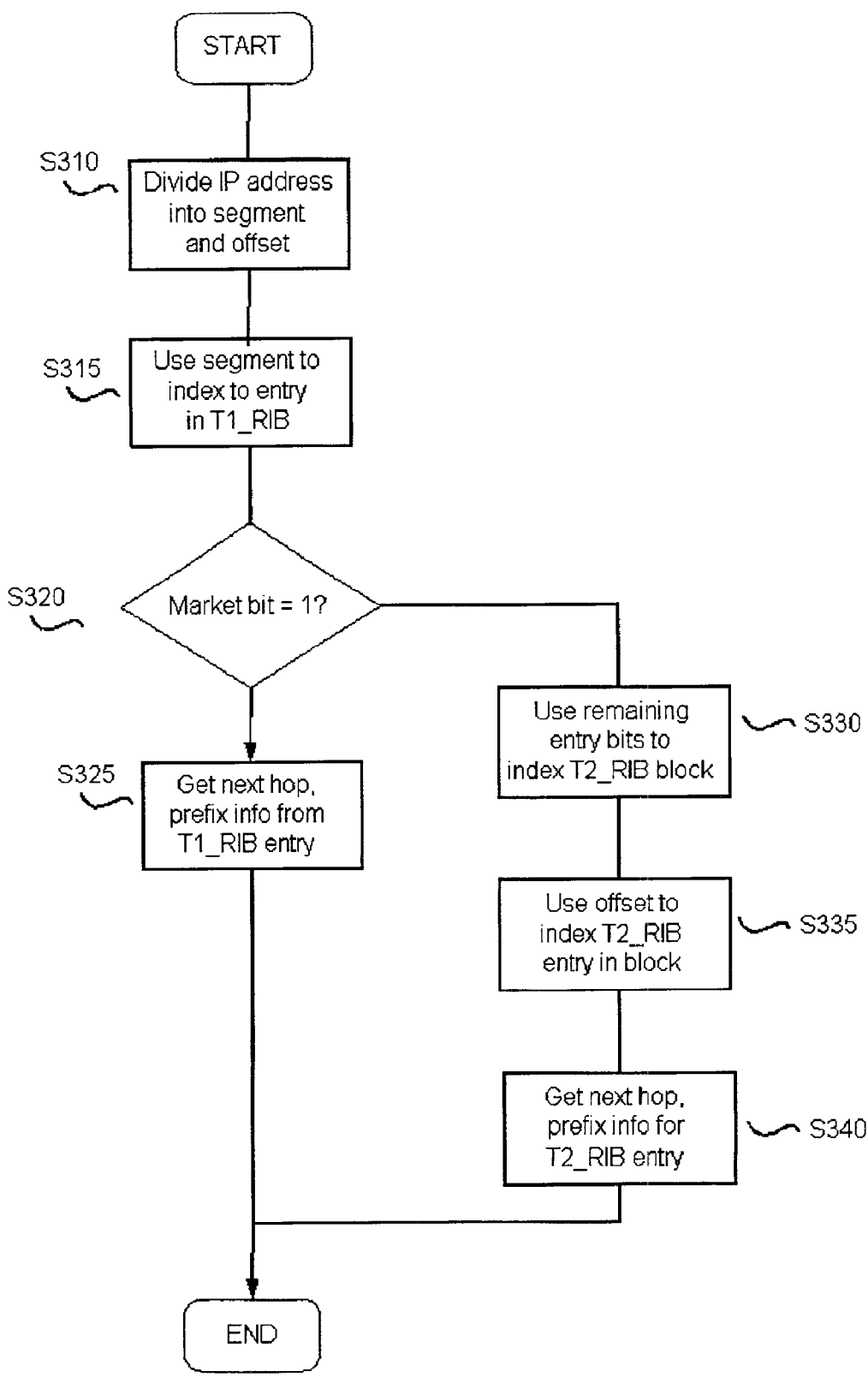
FIG. 6 shows a technique for table lookup according to another embodiment of the present invention.

A lookup method using this data structure (10), then, might proceed as shown in FIG. 6. First, take the incoming IP address (25) and divide it into its segment (30) and offset (35) portions (S310). Use the segment value (30) to index to a particular entry (40) in the T1_RIB table (15)(S315). Check the marker bit (55) for the entry (40) (S320). If the marker bit (55) is zero, obtain next hop information (60) and prefix length information (65) for the IP address (25) from the remaining bits of the entry (40) (S325). If, however, the marker bit (55) is 1, use the remaining bits to index to a block (45) of entries (50) in T2_RIB (20) (S330). Within the block (45) of entries (50) in T2_RIB (20), use the offset (35) to index to a particular entry (50) (S335) from which next hop and prefix length information is obtained (S340).

Upon receiving an IP routing control packet, which contains the information in the 3-tuple (ip_addr, prefix_length, next_hop), the route update method takes the steps shown in APPENDIX A to update the routing information base by adding a route into the routing table. Deleting a route is similar, but the steps are taken in reverse order (the deletion procedure will be a readily apparent to those skilled in the art and is therefore omitted for brevity). Note that due to the underlying data structure, the update method does an incremental route update instead of an aggregate route update. The update method presented here does not require the routes to be sorted. Thus, this update method is fairly efficient.

For each route update, two cases should be considered: 1) for prefix_length<=24 and 2) for prefix_length>24.

For the first case, prefix length<=24, the method needs to determine how many entries (40) are affected by the new route update. Consider the example of a new route update of 128.3/16/1. The route update method will match $2^{24-16}=256$ entries in T1_RIB (15) from 128.3.0 to 128.3.255. For each matched entry (40) in T1_RIB (15), the marker bit (55) needs to be checked. If the marker bit (55) is 0, then the method checks whether the prefix_length (65) is equal to or larger th an old_prefix_length that is stored in the table. If the answer is yes, then the entry needs to be updated with a new next_hop<<6+prefix_length (NHPL); otherwise, the entry isn't changed. If the marker bit (55) is 1, then the method needs to retrieve the pointer stored in T1_RIB (115) which is more specific than the old route stored in the T2_RIB (20) table, that is, for each matched entry in T2_RIB (20), if the prefix length >=old_prefix_length, the method needs to update the entry with the new NHPL.

For the second case, prefix_length<24, the method uses the first 24 bits in the prefix to match one entry in T1_RIB (15). If the marker bit (55) is 0, the method needs to get a new index, distinct from other indices stored in T1_RIB (15), to point to T2_RIB (20) where next hop and prefix length information will be stored. The method also needs to change the marker bit (55) to 1 and store the new index in the T1_RIB entry (40). For each matched entry in T2_RIB (20), the method needs to fill it up with the new NHPL. For example, for a new route update of 128.3.255.252/30/2, it will match $2^{32-30}=4$ entries in T2_RIB (20) with offset from 252 to 255. For those four matched entries, the method will update them with the new NHPL. For those unmatched 256−4=252 entries, the method will update them with the old NHPL which is stored in T1_RIB[128.3.255]. If the marker bit (55) is 1, the matched entries in T2_RIB (20) will be updated with new NHPL only if the new route is more specific (that is, if the prefix_length >=old_prefix_length). The other unmatched entries in T2_RIB (20) will not need to be changed.

Note that the first level table T1_RIB (15) stores redundant information. For example, suppose there is a route (128.3.0.0/16/1) and there are no other routes beginning with "128.3". Then all entries (40) (from 128.3.0 to 128.3.255) in T1_RIB (15) store the same information. This redundancy can be exploited with the concept of NHPL dimension as follows.

Analyzing T1_RIB entries (40) from various backbone routes and dividing T1_RIB (15) into blocks, each block has, for example, $2^6=64$ entries and totally there are $2^{18}$ blocks for the whole T1_RIB table (15) (the block size can be another value; 64 was chosen since it readily fits into a 128 bit wide processor interface width). Specifically, the entries (40) from 0.0.0 to 0.0.63 are grouped as block 1, 0.0.64 to 0.0.127 as block 2, . . . , 255.255.192 to 255.255.255 as block 262,144. For each block which has 64 entries (40), a counter is initialized to one. The block is scanned one entry (40) at a time from the second entry (40) to the 64th entry (40) in the block. For each entry (40), the counter will be increased by one if the current entry's NHPL[15:0] is different from the previous entry's NHPL[15:0]. Note that if the marker bit (55) in the entry (40) is one, this entry (40) will definitely be different from its previous entry (40) as well as the following entry (40) since T1_RIB (15) has distinct indices into the second level table (20). When finished, this count is the dimension of NHPL, dim(NHPL), for that block.

TABLE 3 gives the number of blocks whose dim(NHPL) is equal to one, two and more than two, in the second, third and fourth row, respectively, for the previously discussed data set. It shows that more than 98% of the blocks have a dim(NHPL) is equal either to one or two. The maximum dim(NHPL), Kmax, is reported in the fifth row in the table while the average dim(NHPL), Kavg, in the last row. Kmax can be from 33 to 44 for the five backbone routers while Kavg is in the range from 1.08 to 1.14. From this table, one sees that there is a lot of redundancy in T1_RIB (15).

TABLE 3

| NAP\ dim(NHPL) | Mae-East NAP | Mae-West NAP | AADS NAP | PacBell NAP | Paix NAP |
|---|---|---|---|---|---|
| 1 | 257395 | 257552 | 255454 | 254334 | 256736 |
| 2 | 924 | 836 | 1483 | 1695 | 784 |
| 3–Kmax | 3825 | 3756 | 5207 | 6115 | 4624 |
| Kmax | 42 | 41 | 40 | 33 | 44 |
| Kavg | 1.08 | 1.09 | 1.11 | 1.14 | 1.14 |

Figure 3:
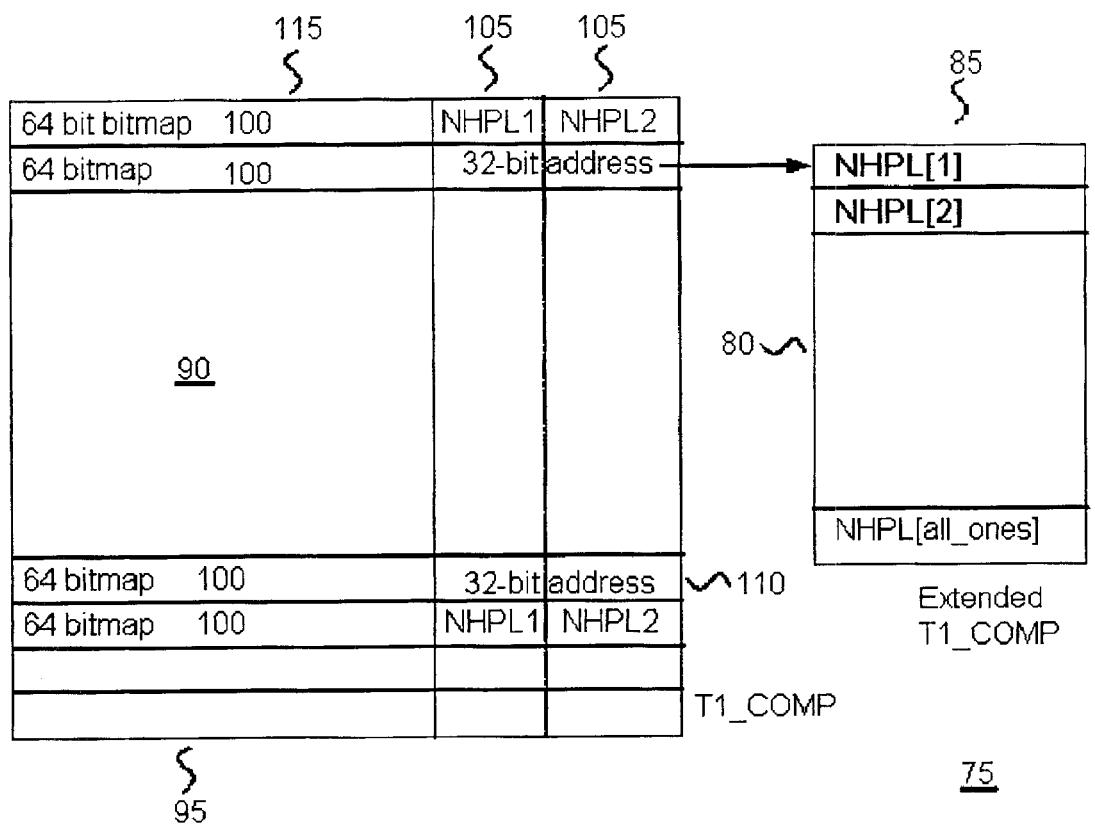
FIG. 3 shows a 24/8c data structure in the embodiment.
Figure 4A:
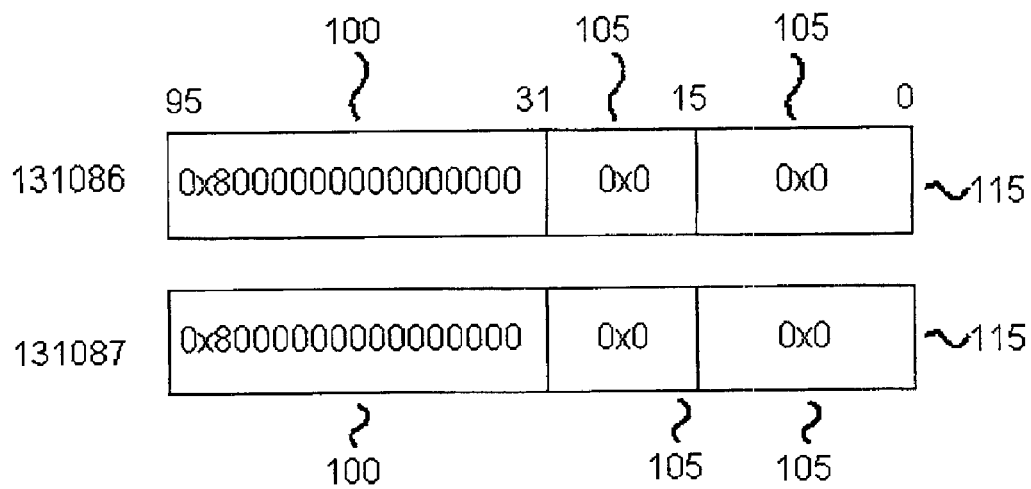
FIGS. 4A–4D show an illustrative example of table update in the embodiment.
Figure 4B:
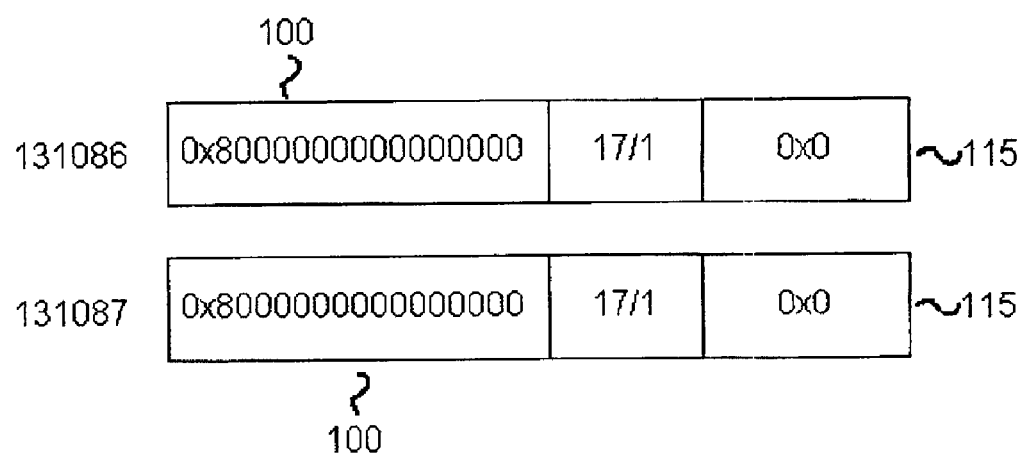
Figure 4C:
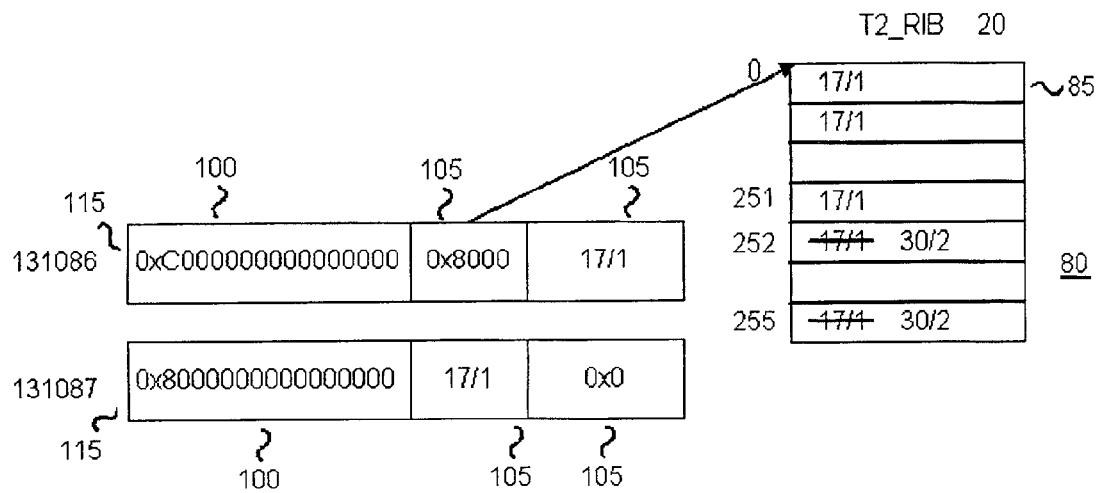
Figure 4D:
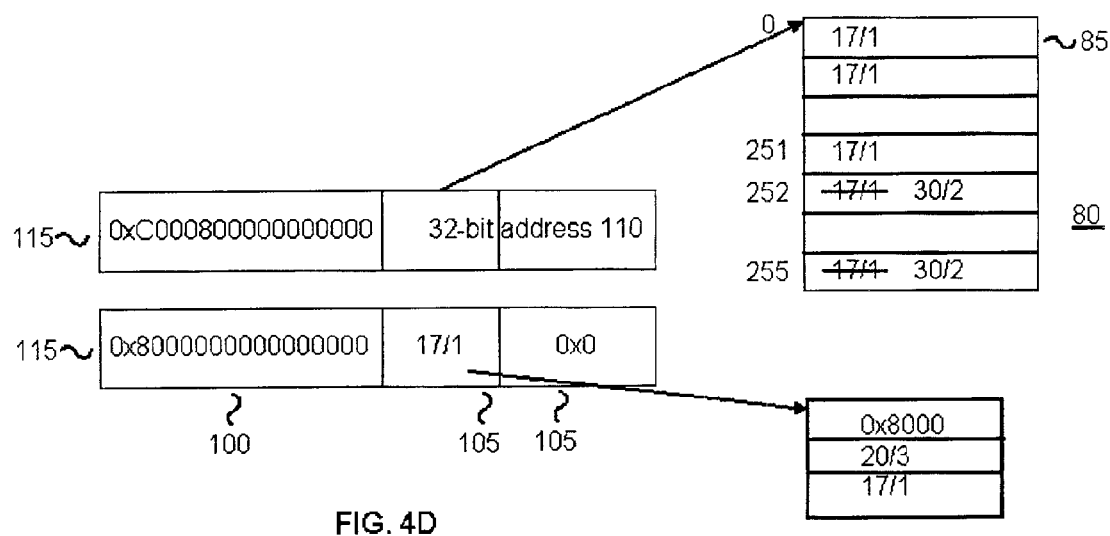

Next, a data structure hereinafter called 24/8c (75) which uses a bitmap to compress T1_RIB (15) to about 3 MB is developed. As shown in the above analyses, about 98% of the entries (40) in T1_RIB (15) store redundant information. FIG. 3 shows the 24/8c compressed data structure (75) including basic lookup table T1_COMP (90) and extended T1_COMP table (80). Note from TABLE 3 that there are about 2% of the entries in T1_RIB (15) having a dim (NHPL) greater than two. These entries require extended T1_COMP tables (80) to store NHPL information. Each entry (85) in the extended T1_COMP (80) is two bytes storing next hop/index and prefix length information. In the compressed 24/8c data structure (75), NHPL[i] will definitely be different from its previous NHPL[i−1] and the following NHPL[i+1] for reasons explained below. From analyzing the routing traces from those backbone routers, one notes that the size of the extended T1_COMP tables (80) is less than 80 KB.

Each entry t1_entry in the first level table T1_COMP (90) has 12 bytes (96 bits). The fields of T1_COMP table entries (95) are used as follows.

t1_entry[95:32] stores a 64 bit bitmap (100). The most significant bit t1_entry[95] is always set to 1. For a bit at position, e.g. K, the number of leading ones from the most significant bit to this position (including the bit at this position) gives the index into the NHPL array which stores next hop/index and prefix length information (60) and (65), respectively.

t1_entry[31:0] stores one to two NHPLs (105) or a 32-bit address (110). If all_ones, which is the total number of ones in the bitmap t1_entry[95:32], is one, t1_entry[31:16] stores NHPL[1]. If all_ones is two, t1_entry[31:16] stores NHPL[1] and t1_entry[15:0] stores NHPL[2]. Otherwise, all_ones>2 and t1_entry[311:0] stores a 32-bit address (110) which points to where the NHPL array (80) is stored (i.e., t1_entry[31:0]=&NHPL[1]).

The most significant 18 bits of the IP destination address (25) are used as an index into T1_COMP (90). The first level table T1_COMP (90) has $2^{18}$ entries (115), each of which is 12 bytes long. The total T1_COMP table (75) is 3 MB. The following six bits of IP destination address (25) are used as an index into the bitmap position at the entry t1_entry[95:32]. For example, given an IP address (25) of 128.3.255.0;

1000 0000.0000 0011.1111 1111.0000 0000 the first 18 bits are 128.3.3:

1000 0000.0000 0011.11

So, this partial address will index into the entry t1_entry= T1_COMP[128.3.3]. The following six bits are 111111. This will be mapped to the last bit in the bitmap.

The second level table T2_RIB (20) in the 24/8c structure (75) is the same as that in the 24/8 structure (10). If the size of the table T2_RIB (20) table grows in the future, a bitmap can be used in a similar fashion to the T1_RB table (15) to compress T2_RIB (20) as well.

As an example, consider the first 64 entries in T1_RIB (15) in the 24/8 data structure (10). Suppose the first entry (40) is 0/1/16 (which means the marker bit (55) is zero, the next hop (60) is one and the prefix length (65) is 16), the second entry (40) is 0/2/24, the third entry (40) is the same as the second entry (40), the fourth entry (40) is 1/1 (the marker bit (55) is one, the index (70) is one), the fifth entry (40) is 0/3/16, and the remaining 59 entries (40) are the same as the fifth entry (40).

Then, the bitmap (100) of the first entry (115) in T1_COMP (90) of the 24/8 c structure (75) can be created as "110110 . . . 0". The first bit is always one:

1

The second bit is one since the second entry (40) (0/2/24) is different from the first entry (40) (0/1/16):

11

The third bit is zero since the third entry (40) (0/2/24) is the same as the second entry (40) (0/2/24):

110

The fourth bit is one since the fourth entry (40) (1/1) is different from the third entry (40) (0/2/24):

1101

The fifth bit is one since the fifth entry (40) (0/3/16) is different from the fourth entry (40) (1/1):

11011

All the remaining 59 bits are zero since the remaining entries (40) share the same entry information as the fifth entry (40) (0/3/16):

110110 . . . 0

Note that the total number of ones is four in this bitmap, which is more than two. So, the t1_entry[31:0] in the first entry (40) at T1_COMP (90) in the 24/8c structure (75) points to where the NHPL's information is stored (i.e., t1_entry[31:0]=&NHPL[1]). The NHPL array (80) is filled as follows: NHPL[1]=0/1/16, NHPL[2]=0/2/24, NHPL[3]=1/1, NHPL[4]=0/3/16.

Next, a route update method is designed to create the bitmap (100) and NHPL array (80) for the 24/8 c data structure (75) without creating the T1_RIB table (15) for the 24/8 data structure (10) first and then analyzing it. In other words, it is possible to create the T1_COMP table (75) for the 24/8c structure (75) directly.

Figure 5:
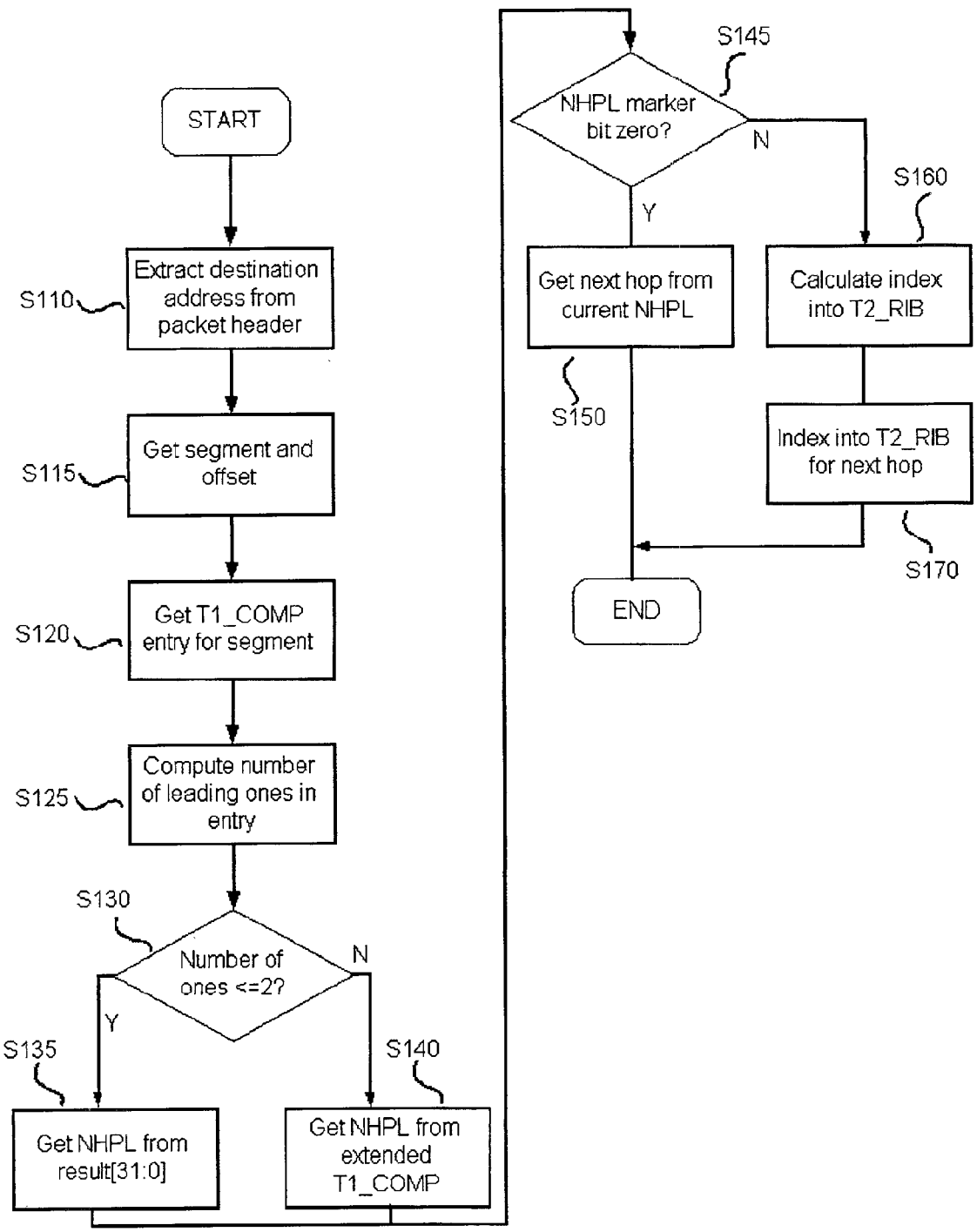
FIG. 5 shows a technique for table lookup according to an embodiment of the present invention.

With reference to FIG. 5, upon receiving an IP data packet with its destination address (25) as ip_addr[31:0] at the ingress line card, the route lookup method takes the following steps for routing table lookup. First, the method extracts the 32-bit destination IP address field (25) from the packet header ip_addr[31:0] (S110) and divides the 32-bit IP address (25) into segments (30) and offsets (35) (S115): segment[17:0]=ip_addr[31:14], offset1[5:0]=ip_addr[13:8], offset2=ip_addr[7:0]. Using segment[17:0] as an index into the first level table T1_COMP (90), a single cache (if it is a cache hit) or memory (cache miss) read is performed to yield a 12-byte result result[95:0]=T1_COMP[segment] (S120).

Next, the number of total leading ones in the bitmap (100) result[95:32], say, all_ones, is computed (S125). If all_ones<=2 (S130), result[31:0] gives the NHPL (105) (S135).

Otherwise, result[31:0] is an address (110) pointing to where the NHPLs (105) are stored (S140). For all_ones>2, the position bit K=95−offset1 is obtained and the number of leading ones in result[95:K], say, leading_ones, is computed. The value of leading_ones is the same as the index of the entry for this address in the extended T1_COMP table 85. Thus, the next hop/index and prefix length information NHPL[leading_ones] is then obtained.

If the marker bit of NHPL[15] is zero (S145), which indicates that it is not necessary to access the second level table T2_RIB (20), the next hop is given by NHPL[14:6] (S150). Otherwise, the index into the second level table (20) is computed. Note that T1_COMP (90) has many continuous regions with each region having 256 entries. If the mark bit (55) is 1, NHPL[14:0] points to a particular region and the index can be computed by multiplying NHPL[14:0] by 256 and adding the product to the last eight bits of the original IP destination address (25), i.e., index=NHPL[14:0]×256+ip_addr[7:0] (S160). Then, one more cache (if it is a cache hit) or memory (cache miss) read is used to get result[15:0]=T2_RIB[index]. The next hop is given by result[15:6] (S170).

Route lookup pseudo code is shown in APPENDIX B.

Figure 8A:
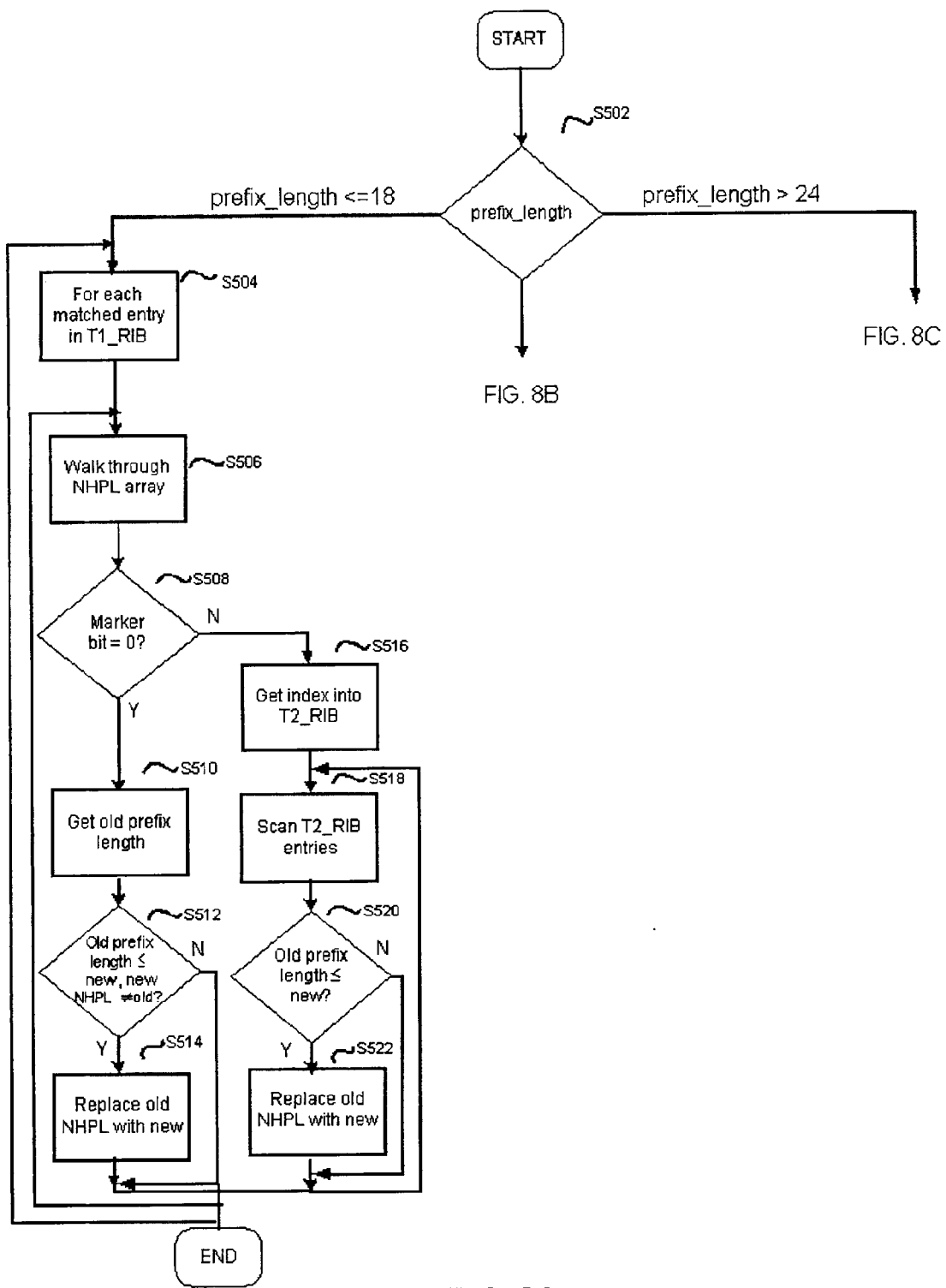
FIGS. 8A–8C shows a technique for table update in another embodiment.
Figure 8B:
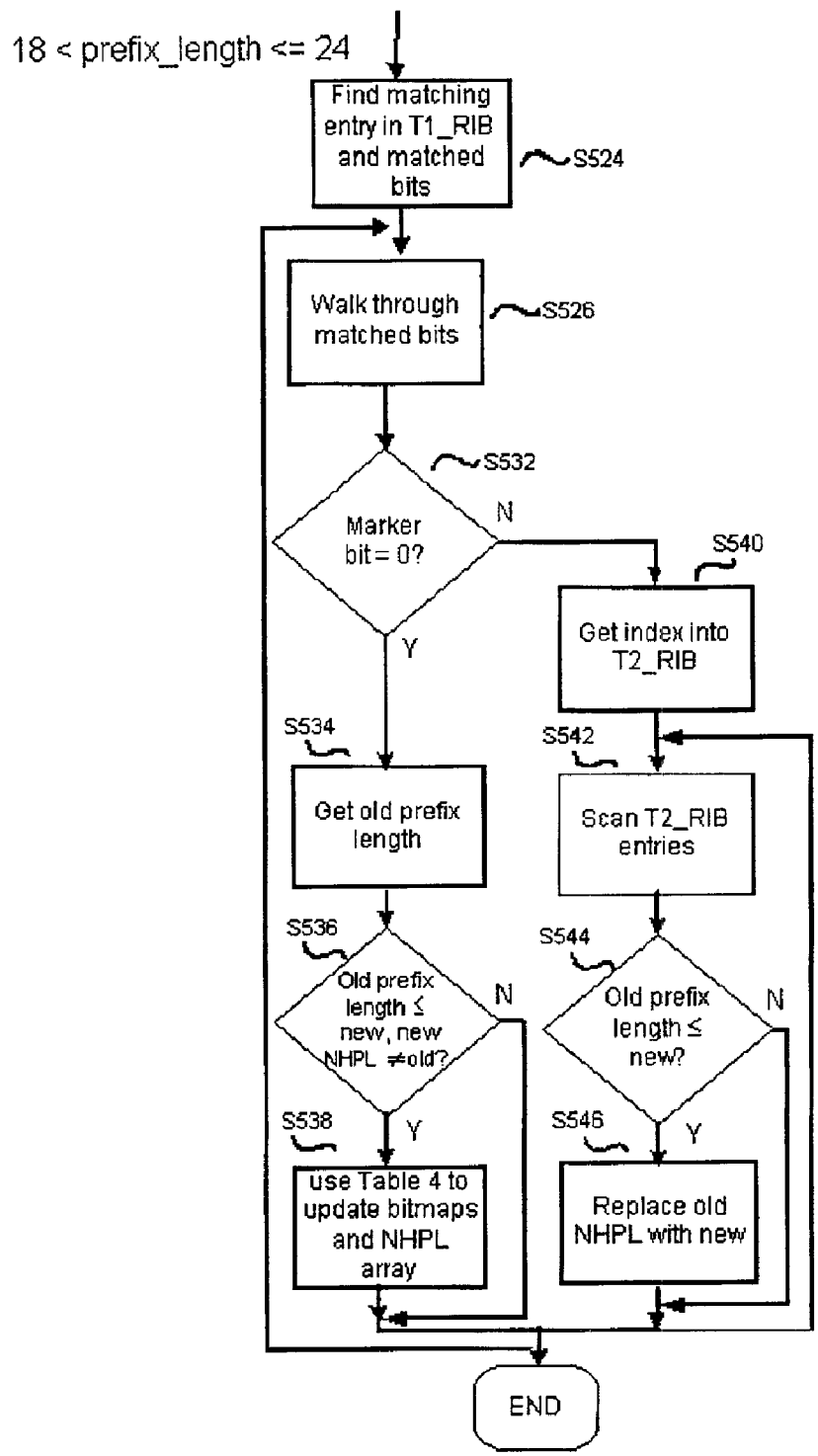
Figure 8C:
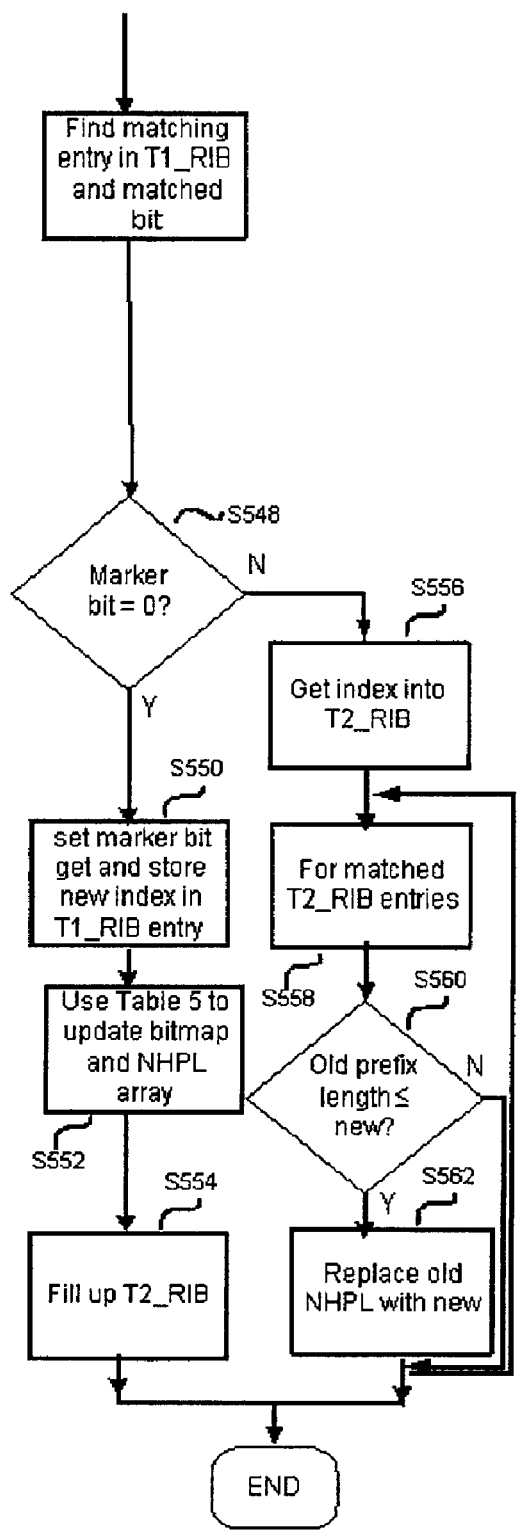

Upon receiving an IP routing control packet which contains the information in the three-tuple (ip_addr, prefix_length, next_hop), it is necessary to update the routing table. With reference to FIG. 2, the new NHPL is computed as new_nhpl[15:0]=next_hop<<6+prefix_length (S210). That is, next_hop is shifted six bits to the left and prefix_length is added to occupy the low-order six bits. As shown in FIG. 8, if the new NHPL is different from what is stored in the table, and the new route is more specific than what is stored in the table, it is necessary to modify the table as described below. Three cases need to be considered: prefix_length≦18; 18<prefix_length≦24; prefix_length>24 (S502).

Case 1: prefix_length≦18—Here, there is no need to change the bitmap (100). The reason is that for this case is that the IP address as determined by the prefix length matches the entire bitmap (100). This implies that dim (NHPL) is not changed. Only the contents of the NHPL array (80) may need to be updated.

For example, suppose the initial routing table is empty. For a first route update (128.0.0.0/8/1), the technique updates the T1_COMP (90) entries from 128.0.0 to 128.255.3, a total of 1024 entries. The bitmap (64) in these entries will remain the same, i.e., 0x8000000000000000), but the NHPL array is changed to NHPL[1]=1/8 (next hop/prefix length). For a second route update (128.3.0.0/16/2), the T1_COMP (90) entries from 128.3.0 to 128.3.3, a total of four entries, are updated. The bitmap (64) will be unchanged. Here, there is only a need to update the NHPL associated with these matched entries with NHPL[1]=2/16 since the second route is more specific than the first route.

Thus, returning to the above example, the route update will match one or more entries (95) in T1_COMP (90). For example, the route update may match exactly one entry for a prefix_length of 18. If prefix_length is eight, it will match $2^{18-8}=2^{10}=1024$ entries in T1_COMP (90).

For each matched entry in T1_RIB (S504), each matched entry in the NHPL array (80) needs to be walked through to see whether there is a need to change the NHPL (S506). For each NHPL entry (85), if the marker bit is zero (S508), the old prefix length (65) stored in the table is obtained (S510). Then, if the old prefix length (65) is less than or equal to the new prefix length and the new NHPL is not equal to the old NHPL (S512), it is necessary to replace the old NHPL stored in the table (80) with the new NHPL (S514). If the marker bit is one, however, it is necessary to get the index into T2_RIB (20) (S516) and scan the whole 256 entries in T2_RIB (20) (S518). For each entry (50) in T2_RIB (20), if the old prefix length (65) is less than or equal to the new prefix length (65) (S520), it is necessary to replace the old NHPL information with the new NHPL information (S522).

Case 2:18<prefix_length<24—In this case, the IP address will match exactly one entry in T1_COMP (90) (S524). For the matched entry, it may match one or more bits in the 64-bit bitmap (100) (S526). For example, for prefix_length=24 the IP address matches exactly one bit in the bitmap (100). For prefix_length=20, it matches $2^{24-20}=2^4=16$ bits in the bitmap (100). For each matched bit, it is necessary to walk through the bitmap (100) from left to right (S526) (alternatively, a method can be implemented which considers blocks of bits in the matched bitmap, rather than one bit at a time) and see whether there is a need to change the bitmap (100) based on various conditions. If the marker bit in the old NHPL is zero (S532), additional cases should be considered. The bitmap (100) and NHPL array need to be updated (S538) if the new address is more specific than the old address (S534), i.e., if the old prefix length (65) is less than or equal to the new prefix length (65), and the new NHPL is distinct from the old NHPL stored in the table (80) (S536).

Let P, C, and F represent the NHPL (85) associated with the previous bit, current bit, and the following immediate bit whose value is one, respectively. Also, let N represent the new NHPL (85). Consider the current bit position at the beginning. The bit value can only be one since the most significant bit is always set to one. Two cases should be considered here: the following bit is zero or one. If the following bit is zero, this means that the next bit has the same NHPL as the first bit in the table (95). Since there is a need to update the NHPL C associated with the first bit, the NHPL array entry is changed from "C F" to "N C F" and the bitmap (100) is changed from "10 . . ." to "11 . . .". For the other case where the following bit is one, if the new NHPL N is not equal to F, the NHPL array entry is changed from "C F" to "N F" by replacing N with C. There is no need to change the bitmap "11 . . .". In this case, the dimension of the NHPL array is not changed.

If the new NHPL N happens to be the same as F, there is a need to change the NHPL array entry from "C F" to "F" by deleting the current NHPL. In this case the dimension is reduced by one. The bitmap (100) is changed from "11 . . ." to "10 . . .". TABLE 4 lists all cases and gives the old bitmap pattern, the condition under which the bitmap (100) and NHPL array entry should be changed, the new bitmap (100), the old NHPL and new NHPL, the change of NHPL array dimension, etc. (S538) Derivation of entries in TABLE 4 will be readily apparent to those skilled in the art.

If the marker bit in the old NHPL is one (S532), it is necessary to get the index into T2_RIB (20) (S540) and scan all 256 entries (50) in T2_RIB (20) (S542). For each entry (50) in T2_RIB (20), if the old prefix length (65) is less or equal to the new prefix length (65) (S544), it is replaced with new NHPL information (S546).

Case 3: prefix$_{length>}$24—In this case, the new route will match exactly one entry in T1_COMP (90) and one bit in the 64-bit bitmap (100). It is only necessary to update the bitmap (100) and NHPL array (80) if the old prefix length (65) is less than or equal to the new prefix length (65) and the new NHPL is distinct from the old NHPL stored in the table. If the marker bit in the old NHPL is zero (S548), it is necessary to get a new distinct index in the range from zero to 32,767 (which has not been used in T1_COMP (90)) (S550), store it in the entry at T1_COMP (90) and set the mark bit to one (S550). The index will point to a region of T2_RIB (20) with 256 entries. Unmatched T2_RIB entries (50) are filled with the old NHPL stored in the T1_COMP (90) entry while the remaining matched T2_RIB entries (50) are filled with new NHPL. All the cases listed in TABLE 5 should be considered (S552). It is necessary to update the bitmap (100) and NHPL array (80) based on the bit pattern of the current bit and the following bit. If the marker bit in the old NHPL is one (S548), it is necessary to get the index into T2_RIB (20) (S556) and update the matched entries in T2_RIB (20) (S558) with new NHPL (S562) if the old prefix length there is no more than the new prefix length (S560).

TABLE 5

| Current position | Bitmap old | Bitmap new | Condition | NHPL and its dim old | NHPL and its dim new | dim | Remarks |
|---|---|---|---|---|---|---|---|
| begin | 10 | 11 | No | C F | N C F | +1 | insert before current |
|  | 11 | 11 | No | C F | N F | 0 | replace current NHPL |
| middle | x00x | x11x | No | P F | P N P F | +2 | insert after & duplicate |
|  | x01x | x11x | No | P F | P N F | +1 | insert after current |
|  | x10x | x11x | No | P C F | P N C F | +1 | insert before current |
|  | x11x | x11x | No | P C F | P N F | 0 | replace current NHPL |

TABLE 4

| Current position | Bitmap old | Bitmap new | Condition | NHPL and its dim old | NHPL and its dim new | dim | Remarks |
|---|---|---|---|---|---|---|---|
| begin | 10 | 11 |  | No condition | C F | N C F | +1 | insert before current |
|  | 11 | 11 | if (N != F) | C F | N F | 0 | replace current NHPL |
|  |  | 10 | else | C F | F | −1 | delete current NHPL |
| middle | x00x | x11x | No condition | P F | P N P F | +2 | insert after & duplicate |
|  | x01x | x11x | if (N != F) | P F | P N F | +1 | insert after current |
|  |  | x10x | else | P F | P F | 0 | no change of NHPLs |
|  | x10x | x11x | if (N != P) | P C F | P N C F | +1 | insert before current |
|  |  | x01x | else | P C F | P C F | 0 | no change of NHPLs |
|  | x11x | x10x | if (N == F) | P C F | P F | −1 | delete current NHPL |
|  |  | x01x | else if (N == P) | P C F | P F | −1 | delete current NHPL |
|  |  | x11x | else | P C F | P N F | 0 | replace current NHPL |
| end | x0 | x1 | No condition | P | P N | +1 | insert after current |
|  | x1 | x1 | if (N != P) | P C | P N | 0 | replace current NHPL |
|  |  | x0 | else | P C | P | −1 | delete current NHPL |

TABLE 5-continued

| Current position | Bitmap old | Bitmap new | NHPL and its dim Condition | NHPL and its dim old | NHPL and its dim new | dim | Remarks |
|---|---|---|---|---|---|---|---|
| end | x0 | x1 | No | P | P N | +1 | insert after current |
|  | x1 | x1 | No | P C | P N | 0 | replace current NHPL |

The complete update method is given in the form of pseudo code in APPENDIX C.

An illustrative example shown in FIGS. 4A–4D assumes that the routing table is initialized with the default next hop value zero and prefix length zero. The most significant bit of the 64-bit bitmap (100) is set to one. The change of the T1_COMP and T2_RIB tables (75) and (20), respectively, for the following route updates coming sequentially is shown below:

128.3.128/17/1

128.3.128.255/30/2

128.3.128/20/3

The decimal value of the most significant 18 bit IP address 128.3.128—binary value 1000 0000.0000 0011.1000 0000 is 131086. After the first route update whose prefix length is less than 18, there is no need to change the bitmap (100). The new NHPL (0x0051) replaces the old NHPL (0x0, i.e., the default route). The first route matches two entries (due to the fact that the prefix length is 17) in T1_COMP (90) indexed by 131086 and 131087.

For the second route, the decimal value of the most significant 18 bits of the second route IP address "128.3.128.255" is 131086. The decimal value of the following six bits is zero. Since the prefix length (65) of the second route is (30), it matches exactly one bit which is the most significant bit (i.e., a begin bit). According to TABLE 5 it is necessary to change the bitmap pattern from "10 . . . " to "11 . . . ". In the meantime, the new NHPL should be inserted before the current NHPL. Since the second route update has a prefix length (65) greater than 24, it is necessary to create a second level table T2_RIB (20). Since this is the first creation of T2_RIB (20), the index value is zero. This will insert 0x8000 (set the marker bit to one) into the T1_COMP NHPL "field. This points to T2_RIB (20). Since the least significant eight bits in the route update (255) are all ones, this route matches the last four entries in the whole 256 entries of T2_RIB (20). Those unmatched entries indexed from zero to 251 are filled with the old NHPL information (0x0051) and matched entries from 252 to 255 with the new NHPL 0x009e.

The third route update matches one entry in T1_COMP (90) with index 131086. Since its prefix length is 20, it matches 2^(24−20)=16 bits in the bitmap (100) beginning with the most significant bit in the 64-bit bitmap (100). The matched bits are walked through one at a time. For the beginning bit which is a pointer to T2_RIB (20), the third route is more specific than the first route. It updates all the entries from zero to 251 with the new NHPL (0x00d4). After processing all the other matched bits, the update method essentially changes the old bit map "0xC000000000000000" to "0xC000800000000000" and the old NHPL array "0x8000, 0x0051" to "0x8000, 0x00d4, 0x0051" (the dimension is increased to three, which is more than two now). This requires an address to be put into T1_COMP (90) at the least significant 32 bits pointing to where the extended T1_COMP (80) is stored.

The 24/8c data structure (75) and lookup/update methods have been implemented in the C programming language for evaluation purposes. The evaluation software can run on almost any processor platform which supports the C language. The simulation described below uses the Xtensa processor manufactured by Tensilica, Incorporated of Santa Clara, Calif. Xtensa is a high-performance and configurable 32-bit RISC-like microprocessor core. Xtensa permits configuration of such processor features as bus width, cache size, cache line size, the number of interrupts, etc. as shown in TABLE 6.

TABLE 6

| Target options | |
|---|---|
| Geometry/Process | 18 m/Worst |
| Frequency | 198 MHz |
| Power Saving | Selected |
| Register File implementation | Latches |
| XT1000 board compatibility | no |
| Wind River VXWorks compatibility | no |
| ATI Nucleus compatibility | no |
| Mentor Seamless BFM support | yes |
| Instruction options | |
| 16-bit MAC with 40 bit Accumulator | no |
| 16-bit Multiplier | no |
| CLAMPS | no |
| NSA/NSAU | no |
| MIN/MAX and MINU/MAXU | no |
| SEXT | no |
| Boolean Registers | no |
| Coprocessor Count | 0 |
| Interrupts enabled? | yes |
| Interrupt count | 1 |
| Int 0 type/priority (level) | ExtLevel/1 |
| High Priority Interrupts | no |
| Timers | no |
| Byte Ordering | BigEndian |
| Registers available for call windows | 32 |
| PIF Read/Write widths (bits) | 128/128 |
| Write buffer entries | 32 |
| Instruction Cache (Bytes)/Line size (Bytes) | 16 KB/16 |
| Associativity | 4-way |
| Cache RAM Addr locations × Data width (bits) | 1024 × 128 |
| Tag RAM Addr locations × Data width (bits) | 1024 × 19 |
| Data Cache (Bytes)/Line size (Bytes) | 16 KB/16 |
| Associativity | 4-way |
| Cache RAM Addr locations × Data width (bits) | 1024 × 128 |
| Tag RAM Addr locations × Data width (bits) | 1024 × 19 |
| Byte Enables | 16 |
| Debug | no |
| TIE source for configuration | compresslookup.tie |
| System RAM start address/size | 0 × 40000000/1024 MB |
| System ROM start address/size | 0 × 20000000/128 KB |
| Local Data RAM start address/size | Not selected |
| Local Instruction RAM start address/size | Not selected |
| Local Data ROM start address/size | Not selected |
| Local Instruction ROM start address/size | Not selected |
| User Exception Vector | 0 × 40000210 |
| Kernel Exception Vector | 0 × 40000200 |
| Window Register Overflow Vector | 0 × 40000000 |
| Reset Vector | 0 × 20000020 |

Note that a 198 Mhz target frequency on a $0.18\mu$ technology allows good overall lookup performance. Also, a 128 bit PIF width allows the processor to perform 128 bit cache refills and hence provide better overall system performance during cache misses. 32 is the maximum number of write buffer entries that are allowed by the current implementation. This facilitates store performance (which is good for update performance). Further, using four-way set associative caches with 16 byte line width gives optimum cache performance.

Further, it should be noted that although the Tensilica processor was used herein, the invention may also be implemented in hardware with advantageous effects.

Xtensa also supports the Tensilica Instruction Extension (TIE) language (its syntax is similar to Verilog) which can be used to describe extensions to the core instruction set. Using TIE to add instruction extensions can be quite useful for optimizing functionality and performance in specific applications. Reviewing an embodiment of the lookup method as a sequence of the following steps, one sees that there are a number of opportunities to include custom instructions in the Xtensa instruction set:

1) From the 32 bit destination 'ip_address' obtain 'T1_RIB_index' (18 most significant bits) and bit position in the bit map array 'Bit_Map_Array_index' (middle 6 bits).
2) Using the T1_RIB index as an offset and the address of T1_RIB[0] as the base address, perform a 128 bit load (in reality only a 96 bit load is necessary, but current implementations of the processor support 64 bit and 128 bit loads); use 'Mem128' to denote the contents of this address. This may be done with instruction LOAD128, which loads one entry (128 bit) from T1_COMP (90) given the base address of the T1_COMP table (75) and the offset.
3) Count the number of ones in Mem128[127:76]. This may be done with instruction ALLONES, which computes the total number of ones for a given 64-bit bitmap (100).
4) Count the number of leading ones in Mem128[127:64] using 'Bit_Map_Array_index' as the offset. This is implemented as a sequence of two operations. Mem128 [127:64]>>(63-Bit_Map_Axray_index) and counting all ones in the resulting bit vector. This may be done using instruction LEADONES, which computes the number of leading ones from the most significant bit to the current bit in a 64-bit bitmap (100).
5) If the total number of ones is either 1 or 2, then the nhop data is stored in either the most significant 2 bytes of Mem128[63:32] or least significant 2 bytes of Mem128 [63:32] respectively. This may be done using instruction GETNHOPADDRFROMT1, which gets the NHPL information from T1_COMP (90).
6) Otherwise if the total number of ones is >2, then Memdata128[63:32] stores the address where the list of next hops (for that T1_RIB base address is stored). Bit_Map_Array_index is used an offset to identify the nhop data. This may be done using instruction GETNHOPADDRFROMADDR, which gets the NHPL information from the extended T1_COMP table (80).
7) If the first bit of nhpl[15:0] (computed from either from step 5) or step 6)) is zero, then next hop is stored in nhpl[15:6].
8) Otherwise, the next hop information is stored in T2_RIB. 'T2_RIB_index' is computed as the sum of base address of &(T2_RIB[0]) and offset into T2 (stored in nhpl[14:0]) plus the last 8 bits of ip_addr. This may be done using instruction INDEXFORT2, which computes the index into T2_RIB (20), and instruction GETNHOPFROMT2, which gets the NHPL from T2_RIB (20).

Based on the above description of the method a TIE instruction is implemented for each step (other than step 7 which is a simple right shift of 6 bits).

APPENDIX D gives the TIE code for these instructions. APPENDIX E gives sample C code for route lookup with the new extended instructions.

Instruction extensions can be used to accelerate the performance of both lookup and update methods. We develop several TIE customized instructions for route lookup. We will also describe Xtensa processor configuration details that was used for these experiments.

The Xtensa Instruction Set Simulator (ISS), also from Tensilica, Incorporated, is used to perform cycle-accurate simulations to study cycle counts and associated profiling data. In the simulation, a route table trace of Class A, B, Swamp and C from the Mae-East database collected on a given date was used to create a routing table database of 19,000 entries. A data packet trace with 250,000 entries, made available from NLANR Network Analysis Infrastructure, was used for route lookup. As noted in TABLE 6, the processor was configured with the following parameters: 128 bit processor interface (PIF), 32 registers, four-way set associate caches with 16 bytes line size, cache size 16 KB and clock frequency with 200 MHz. ISS provided instruction-level profile data for finer analysis as shown in APPENDIX F. The first column is the number of cycles, the second column the program counter (PC), the third column is the hexadecimal value of the instruction and the fourth column is the disassemble dump of the program.

There are 6,592,490 total cycles for 250,000 route lookups. This is equivalent to about 26 cycles/lookup. Also, there are 750,000, 250,000 cycles for entry and return from the function rt_lookup_tie, respectively, i.e., four cycles/lookup. These are the overhead for the function call stack. If macros or inline code are used, these cycles can be avoided. Also, there are (255,313+258,399+537+179)=514,428 cycles for instructions (132*r*, 132*i*, 132*r*, 132*i*.n) which load the base address of table T1_COMP (90) and T2_RIB (20), respectively. It costs 514,428/250,000=two cycles per lookup to load T1_COMP (90) and T2_RIB (20) base addresses. Since these base addresses are constant, these loads can be avoided if function calls are not used. The two shift instructions at the beginning (srli, sili) which get the index to T1_COMP (90) can be combined by developing a new TIE instruction. This will reduce the two cycles to one cycle per lookup. Therefore, about (26−4−2−1)=19 cycles/lookup excluding the overhead are actually needed. This is equivalent to 10.5 MLPS for a 200 MHz Xtensa processor.

Note that instruction LOAD128 takes 1,043,576/250,000=four cycles/lookup. This is because when there is a cache hit, LOAD128 takes two cycles per lookup but for a cache miss, it will take seven cycles plus one memory access cycle (a total eight cycles) for a stall. Since the TE instructions ALLONES is waiting on the result from LOAD128 to compute the total number of ones in the bitmap (100), ALLONES takes two cycles/lookup even though in the TIE description it is defined with one cycle. The instruction GETNHOPADDRFROMADDR and the next instruction srli are using (471,684+687,163)/250,000=4.6 cycles/lookup due to cache miss and processor stall. Since the extended T1_COMP (80) is quite small, it can be put into the on-chip cache. This will reduce the number of cycles for GETNHOPADDRFROMADDR and the next shift to less than two and one cycle/lookup (for a total of three cycles/lookup). The last two instructions cost few cycles per lookup since it is rarely necessary to access T2_RIB (20) for next hop information. Table T2_RIB (20) is small and can also be put into the on-chip cache. Since T1_COMP (90) is 3 MB, it is not practical to put the whole T1_COMP table (75) into the on-chip cache using current technologies. Thus, the lookup method requires at most one memory access (to the T1_COMP table (75)) and at most two cache accesses (to the extended T1_COMP table (80) and T2_RIB table (20)) for each lookup.

The advantage of using a processor instead of ASIC hardware for route lookup are two-fold:

1. Using the processor is more flexible and allows implementation of a different data structure or lookup method.
2. It is possible to make use of cache effects (if a packet lookup hits the cache, it only requires 5 ns access time for a 200 MHz processor).

The disadvantage of using a processor for route lookup is that if there is a cache miss, it will stall the processor and may require many cycles to load the data into the processor. This is a substantial penalty. As observed when the Xtensa processor has a 32 bit PIF width and 64 bytes for cache line size, when there is a stall, it requires 23 cycles to load the data into the processor. This is because the processor is trying to fill up the whole cache line. So, the PIF width may be changed to 128 bits and the cache line changed to 16 bits (another solution is to change the cache attribute to bypass). This requires eight cycles for a stall. This shows that the configurability of Xtensa gives better performance (extensibility with TIE provides an additional performance improvement). A general-purpose CPU does not provide such control. For example, the Pentium may require six cycles when there is an L1 cache miss but a L2 cache hit, it requires about 30 cycles for" an L1/L2 cache miss and main memory access. This shows that Xtensa performance can significantly be improved by properly configuring the processor and adding customized instructions.

IP route lookup usually requires multiple accesses to memory (two for the data structure disclosed herein). The result from the previous memory access determines the address for the next memory access. If the first access is a cache miss, the processor will stall and wait for multiple cycles before it can issue a second access.

Pipelining is possible by storing the routing information tables in a hierarchical fashion and then putting these different tables into separate memories. For example, T1_COMP (90) may be stored in memory1, extended T1_COMP (80) stored in memory2, and T2_RIB (20) stored in memory3. Then, the processor can process three packets at the same time if the processor supports three independent memory accesses (to memory1, memory2 and memory3 simultaneously). This will scale the performance up to 30 MLPS.

Hardware synthesis for the configurable processor has been performed with extended instructions. This needs about 65,000 gates for the configured Xtensa core processor and an additional 6500 gates for the extended TIE instructions.

The embodiment disclosed herein employs a novel data structure to compress a 24/8 routing table (10) from 32 MB to about 3 MB. Through developing a few extended instructions for a configurable processor at 200 MHz, about 10 MLPS of wire-speed packet forwarding can be achieved without buffering. With four configurable processors, the routing lookup capacity can be scaled to 40 MLPS. The data structure can be used for both route lookup and update. It is primitive and can support both large forwarding tables for carrier class/backbone routers and small forwarding tables for edge routers. The lookup scheme introduced supports longest prefix matching. An update method which supports incremental route update is also presented.

Development of packet forwarding specific instructions to accelerate packet forwarding, which can be much faster than traditional RISC instructions, is disclosed. The extended instructions require additional less than 10,000 additional gates. Cycle-accurate results also are given. These show that each route lookup needs about 19 cycles, excluding function call overhead.

Figure 7:
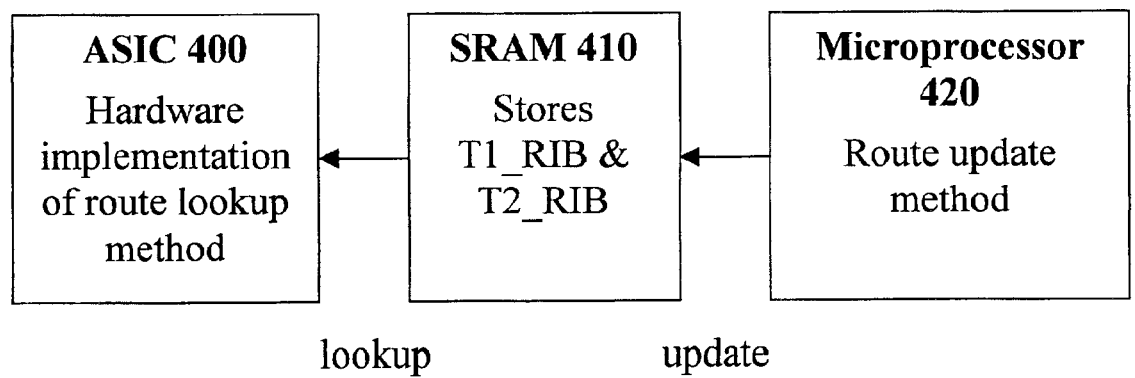
FIG. 7 shows a hardware-based embodiment of the present invention.

The data structures and methods also can be implemented in pure hardware, in which case each route lookup can be designed to have as few as three memory accesses. As shown in FIG. 7, the routing table can be stored in external SRAM with a typical 10 ns access time. Further, the lookup method can be implemented using pipelining techniques to perform three lookups for three incoming packets simultaneously. Using such techniques, 100 MLPS performance can be achieved.

The preferred embodiments described above have been presented for purposes of explanation only, and the present invention should not be construed to be so limited. Variations on the present invention will become readily apparent to those skilled in the art after reading this description, and the present invention and appended claims are intended to encompass such variations as well.

What is claimed is:

1. A computer-readable storage medium configured to store a data structure comprising:

a first lookup table having at least one entry, each of the at least one entry having a bitmap portion and an information storage portion; and a second lookup table having at least one entry, each entry in the at least one entry storing next hop and prefix length information;

wherein:

the at least one entry in the first lookup table is indexable by a first portion of an IP destination address, and bits within the bitmap of the at least one entry are indexable by a second portion of the IP destination address;

the information storage portion of the at least one entry stores next hop and prefix information when the total number of ones in the bitmap of the at least one entry is one of a given set of values;

the information storage portion of the at least one entry stores information pointing to an entry in the second lookup table when the total number of ones in the bitmap of the at least one entry is not one of the given set of values;

the first set of values includes one and two;

the information storage portion of the at least one entry stores one set of next hop and prefix length information when the total number of ones in the bitmap of the at least one entry is one;

the information storage portion of the at least one entry stores two sets of next hop and prefix length information when the total number of ones in the bitmap of the at least one entry is two; and the information storage portion of the at least one entry stores information pointing to an entry in the second lookup table when the total number of ones in the bitmap of the at least one entry is more than two.

2. A method of storing information in the data structure of claim 1, the method comprising:

determining for each entry in a group of entries in a data structure, whether a value of the entry is different from a value of a previous entry, when the entry value is different from the previous entry value, storing a first bit value in a corresponding place in a bitmap corresponding to that group of entries, and when the entry value is the same as a previous entry value, storing a second bit value different from the first bit value in the corresponding place;

when a number of ones in the bitmap is in a first set of values, storing next hop and prefix length information in an entry storing the bitmap, the next hop and prefix length information corresponding to entries in the bitmap; and when a number of ones in the bitmap is in a second set of values, storing an index to next hop and prefix length information corresponding to the bitmap information stored in a second data structure in the entry storing the bitmap.

3. A method of looking up a route and processing a data packet in a communications network, the method comprising:

receiving a data packet from the communications network;

extracting an IP address from a header of the packet;

obtaining a segment and an offset of the IP address;

using the segment to index an entry of the first lookup table;

computing a total number of ones in an bitmap of the indexed entry;

when the total number of ones is in a given set of values, obtaining next hop and prefix information from the information storage portion of the entry;

when the total number of ones is not in the given set of values,
 using the offset to index a bit in the bitmap of the indexed entry,
 determining a number of ones from the beginning of the bitmap to the indexed bit,
 using the number of ones to the indexed bit to index an entry in a second lookup table,
 checking a marker bit of the entry in the second lookup table,
 if the marker bit is zero, obtaining next hop information and prefix length information for the IP adds from the remaining bits of the entry in the second lookup table,
 if the maker bit is one,
  using the remaining bits of the entry in the second lookup table to index to a block of entries in a second data structure,
  within the block of entries in the second data structure, using the offset to index to a particular entry, and
  obtaining next hop and prefix length information from the indexed entry in the second data structure; and using the next hop and prefix length information to forward a packet associated with the IP address to another location on a communications network.

4. The method of claim 3, wherein:

using the segment to index the entry in the first lookup table is done using a processor having an instruction which causes the processor to load an entry from the first lookup table using the segment;

computing a total number of ones in a bitmap of the indexed entry is done using an instruction of the processor which computes a total number of ones in the bitmap;

obtaining next hop and prefix information from the information storage portion of the entry is done using an instruction of the processor which extracts next hop and prefix length information from the first lookup table;

determining a number of ones from the beginning of the bitmap to the index bit is done using an instruction of the processor which computes a number of leading ones from a most significant bit to a current bit in a bitmap;

using the number of ones to the indexed bit to index an entry in a second lookup table is done using an instruction of the processor which computes the index into the second lookup table; and obtaining next hop and prefix length information from the second lookup table is done using an instruction of the processor which gets next hop and prefix length information from the second lookup table.

5. The method of claim 3, wherein the method is performed on a configurable processor.

6. The method of claim 5, wherein the configurable processor includes custom instructions for performing the method.

7. A method of updating a data structure suitable for use in a route lookup system in a communications network, the method comprising:

receiving an IP route having an IP address component, prefix length component and next hop component;

when the prefix length component has a value less than a first predetermined value,
 determining whether an entry of an NHPL table in the data structure needs to be updated based on values of the prefix length and next hop components, and
 updating the entry of the NHPL table based on the determination;

when the prefix length component has a value greater than or equal to a second predetermined value,
 identifying an entry in the data structure which matches the prefix length and next hop information,
 determining whether the prefix length component in the address component is more specific than that stored in the entry, and whether the next hop component in the address component is different from a next hop component in the entry, and
 updating the entry based on the determination; and when the prefix length component is neither less than the first value nor greater than or equal to the second predetermined value,
 determining entries in the data structure matching the prefix length component,
 determining bits in a bitmap of the entries matching the prefix length component,
 for each matching bit, determining whether the prefix length component is more specific than prefix length information associated with that bit and whether the next hop component is different from next hop information associated with that bit, and
 updating an entry in the data structure corresponding to that based on the determination.

* * * * *